United States Patent [19]
Fujiwara et al.

[11] 3,970,534
[45] July 20, 1976

[54] GRAFT COPOLYMER AND PROCESS FOR PREPARATION THEREOF

[75] Inventors: Hiroshi Fujiwara; Kôichi Asano; Akio Sugishita, all of Soka; Asao Takahashi, Saitama, all of Japan

[73] Assignee: Maruzen Oil Co. Ltd., Osaka, Japan

[22] Filed: Jan. 13, 1975

[21] Appl. No.: 540,789

[30] Foreign Application Priority Data
Jan. 11, 1974  Japan.................................. 49-6373
Jan. 11, 1974  Japan.................................. 49-6374

[52] U.S. Cl. .................. 204/159.17; 260/2.1 E; 260/877; 260/878 R; 260/880 R; 260/886
[51] Int. Cl.² .................. C08F 2/46; C08F 255/00; C08F 257/02
[58] Field of Search ........... 260/878 R, 880 R, 886, 260/2.1 E; 204/159.17

[56] References Cited
UNITED STATES PATENTS

| | | | |
|---|---|---|---|
| 3,073,667 | 1/1963 | Bonvicini et al. | 260/878 R |
| 3,162,696 | 12/1964 | Zimmerman et al. | 260/878 R |
| 3,304,272 | 2/1967 | Zenftman | 260/2.1 E |
| 3,634,218 | 1/1972 | Gotohda et al. | 204/159.17 |
| 3,639,516 | 2/1972 | Sarfaty et al. | 260/886 |
| 3,700,609 | 10/1972 | Tregear et al. | 260/878 R |
| 3,847,840 | 11/1974 | Kanig | 260/2.1 E |

*Primary Examiner*—Alan Holler
*Attorney, Agent, or Firm*—Sughrue, Rothwell, Mion, Zinn & Macpeak

[57] ABSTRACT

A graft copolymer comprising a hydrocarbon polymer main chain and a side chain composed mainly of a styrene compound of the following formula (I)

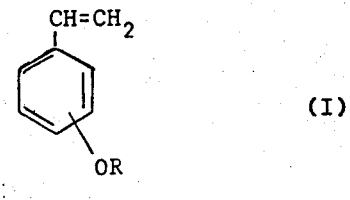

(I)

wherein R is a hydrogen atom or an R'CO group, in which R' is a hydrocarbon group having 1 to 20 carbon atoms, and a polyene compound grafted to the hydrocarbon polymer main chain and a process for preparing the graft copolymer comprising graft-copolymerizing the above copolymer components with the hydrocarbon polymer by ionizing radiation. The graft copolymer is especially suitable as an ion-exchange membrane or a basic polymer matrix for an ion-exchange membrane.

25 Claims, No Drawings

GRAFT COPOLYMER AND PROCESS FOR PREPARATION THEREOF

BACKGROUND OF THE INVENTION

1. Field of the Invention

This invention relates to a graft copolymer comprising a hydrocarbon polymer as a main chain to which a side chain composed of a styrene compound of the formula (I)

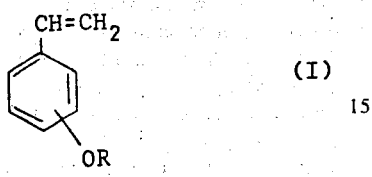

wherein R is a hydrogen atom or an R'CO group in which R' is a hydrocarbon group having 1 to 20 carbon atoms and a polyene compound is grafted; and to a process for preparing the graft copolymer.

2. Description of the Prior Art

It is well known that hydrocarbon polymers having styrene compounds of the formula (I) grafted thereto have a wide range of utility as a result of their improved adhesiveness, dyeability and reactivity with other compounds which characteristics are inherent defects in the hydrocarbon polymers. However, it is desired to improve their mechanical and chemical properties further.

On the other hand, it has previously been known to use polyhydroxystyrene as an ion-exchange membrane. However, membranes of polyhydroxystyrene have the defect of inferior mechanical strength. With a view to increasing the mechanical strength of polyhydroxystyrene ion-exchange membranes, Japanese Patent Publication No. 26955/72 discloses a method for producing cationic exchange membranes from poly(p-hydroxystyrene) in which an inert polymer such as polyvinyl cloride is used conjointly, and poly(p-hydroxystyrene) is used in a partialy chlorinated state. The partial chlorination of poly(p-hydroxystyrene) is not desirable because partial chlorination complicates the process of producing ion-exchange membranes, and results in an increased cost of production and in a decreased number of reactive sites into which various functional groups can be introduced which is a characteristic of polyhydroxystyrene.

SUMMARY OF THE INVENTION

An object of this invention to provide a novel graft copolymer having superior characteristics.

Another object of this invention is to improve the adhesiveness, dyeability, resistance to oxidation, reactivity with other compounds, and mechanical characteristics of hydrocarbon polymers.

Still another object of this invention is to provide a process for preparing the above novel graft copolymer.

A further object of this invention is to provide a graft copolymer which can be used as ion-exchange membranes of excellent quality, or as a basic polymer matrix of ion-exchange membranes.

An even further object of this invention is to provide a graft copolymer which can become a basic polymer matrix of ion-exchange membranes, which has sufficient reactive sites into which ion-exchange groups can be introduced, and which permits introducton of ion-exchange groups under mild conditions.

A still further object of this invention is to provide an ion-exchange membrane having good electrical properties, superior mechanical strength, stability to various chemical treatments, and durability, or a basic polymer matrix from which such ion-exchange membranes can be produced.

The graft copolymer of this invention comprises a main chain of a hydrocarbon polymer and a side chain composed mainly of a styrene compound of the following formula (I)

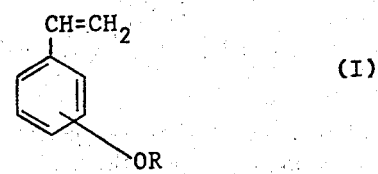

wherein R is a hydrogen atom or an R'CO group in which R' is a hydrocarbon group having 1 to 20 carbon atoms, and a polyene compound having at least two polymerizable double bonds in the molecule grafted to the main chain.

DETAILED DESCRIPTION OF THE INVENTION

The graft copolymer of the invention can be prepared by graft copolymerizing a monomeric mixture composed mainly of the styrene compound of formula (I) and the polyene compound with a hydrocarbon polymer using ionizing radiation; or by first grafting the styrene compound of formula (I) to the hydrocarbon polymer using ionizing radiation, and then introducing the polyene compound into the resulting graft copolymer using ionizing radiation.

The hydrocarbon polymers used in this invention can be aliphatic hydrocarbon polymers, especially those hydrocarbon polymers of monomers containing 2 to 10 carbon atoms, such as polyethylene, polypropylene, poly-1-butene, poly-1-pentene, poly-1-nonene, poly-1-decene, poly-3-cyclopentyl-1-propene, poly-3-cyclohexyl-1-propene, poly-3-methyl-1-butene, poly-3-cyclohelxyl-1-butene, poly-3-phenyl-1-butene, poly-3-methyl-1-pentene, poly-3-methyl-1-hexene, poly-4,4-dimethyl-1-hexene, poly-5-methyl-1-heptene and the like; aromatic hydrocarbon polmyers especially polymers of monomers expressed by the general formula (II)

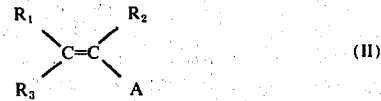

wherein $R_1$, $R_2$ and $R_3$ each represents a hydrogen atom or an alkyl group having 1 to 10 carbon atoms, and A is an aryl group (a) having the formula,

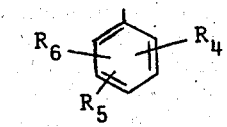

or (b) having the formula

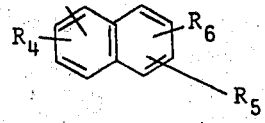

in which $R_4$, $R_5$, $R_6$, $R'_4$, $R'_5$ and $R'_6$ each represents a hydrogen atom or an alkyl group having 1 to 10 carbon atoms, such as polystyrene, poly($\alpha$-methylstyrene) or poly(tertiarybutylstyrene), poly(p-methylstyrene), poly(2,4-dimethylstyrene), poly(2,5-dimethylstyrene), poly(m-ethylstyrene), poly(p-ethylstyrene), poly(p-isopropylstyrene), poly(p-hexylstyrene), poly(p-octylstyrene), poly(p-methyl-$\alpha$-methylstyrene)

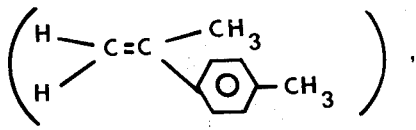

poly($\alpha$-vinylnaphthalene), poly($\beta$-vinylnaphthalene), poly($\alpha$-isopropenylnaphthalene), poly($\alpha$-vinyl-4-methylnaphthalene), poly(1-vinyl-5-ethylnaphthalene), poly(1-vinyl-5,8-dimethylnaphthalene) and the like; alicyclic hydrocarbon polymers, especially polymers of monomers expressed by the general formula (III)

$$R_7HC=CHR_8 \qquad (III)$$

in which $R_7$ and $R_8$ each represents a hydrogen atom, an alkyl group having 1 to 10 carbon atoms or a cycloalkyl group having 3 to 10 carbon atoms, and at least one of $R_7$ and $R_8$ is a cycloalkyl group such as a cyclopropyl group, a cyclopentyl group, a cyclohexyl group, a bicyclo [2,2,1] heptyl group, etc. such as polyvinyl cyclohexane poly(4-methyl-1-vinyl-cyclohexane)

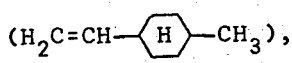

poly(3-methyl-1-vinyl-cylcohexane)

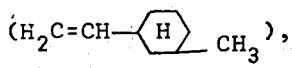

poly(1-cyclohexylpropene-1)

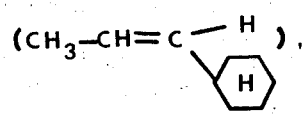

or copolymers derived from two or more of the above described aliphatic, alicyclic or aromatic monomers. The hydrocarbons that make up the main chain of the graft copolymer can contain branched chains.

The range of the degree of polymerization of these polymers is such that the polymers solid at normal temperatures (e.g., 20° – 30°C), for example, a degree of polymerization of above about 10, preferably 50 to 100,000. The polymers can be used in various forms, are as desired, such as powders, granules, fibers or films.

The styrene compounds used in the graft copolymerization in accordance with this invention are hydroxystyrene and acyloxystyrenes as shown below. The hydroxy or acyloxy substituent can be at the ortho-, meta- or para-position, and the styrene compound can be an isomeric mixture of styrene compounds.

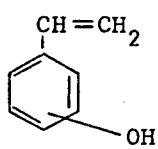 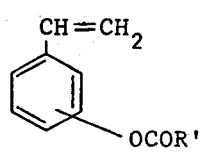

Most generally, p-hydroxystyrene is used as the hydroxystyrene. In the acyloxystyrenes, R' is a hydrocarbon group containing 1 to 20 carbon atoms, such as a straight chain or branched chain alkyl group, or a —(CH$_2$)$_n$—P group in which P is a cycloalkyl group, an alkyl (or phenyl)-substituted cycloalkyl group, an aryl group or an alkyl-substituted aryl group, and $n$ is 0 or an integer such that the total number of carbon atoms in the (CH$_2$)$_n$—P group is not more than about 20. Suitable examples of the —OCOR' group which can be substituted on the styrene moiety are straight chain acyloxy groups such as acetoxy, propionyloxy, butyryloxy, valeryloxy, caproyloxy, stearyloxy, etc. groups, branched chain acyloxy groups such as isobutyryloxy, trimethylacetoxy, etc., groups, etc., cycloalkylcarboxy groups such as cyclopropanecarboxy, cyclobutanecarboxy, cyclopentanecarboxy, cyclohexanecarboxy, cycloheptanecarboxy, cyclooctanecarboxy, bicylo[2.2.1] heptanecarboxy, etc. groups as well as the alkyl-substituted and aryl-substituted derivatives thereof such as the 1-methyl-, 2,2-dimethyl-, 1-isopropyl-, 1-phenyl- derivatives thereof such as 1-methylcyclohexanecarboxy, 2,2-dimethylcyclohexanecarboxy, 1-isopropylcyclohexanecarboxy, 1-phenylcyclohexanecarboxy, etc. groups; cycloalkylacyloxy groups such as cyclohexylacetoxy, $\omega$-cyclohexylpropionyloxy, etc. groups; aroyloxy and alkaroyloxy groups such as benzoyloxy, toluoyloxy, 2,3-dimethylbenzoyloxy, p-ethylbenzoyloxy, p-isopropylbenzoyloxy, etc. groups; arylacyloxy and alkarylacyloxy groups such as phenylacetoxy, 2-methylphenylacetoxy and the like. Most generally, p-acetoxystyrene is used.

The polyene compound used in the graft copolymerization in accordance with this invention is a polyene compound containing at least two polymerizable double bonds in the molecule. Examples of suitable polyene compounds that can be used in this invention are aliphatic compounds such as butadiene, isoprene, 1,4-pentadiene, 1,4-hexadiene, 1,5-hexadiene, 1,2-divinylcyclobutane, 1,7-octadiene, 1,6-heptadiene, 1,3-pentadiene, dimethylbutadiene, 3-methyl-1,3-butadiene and the like; alicyclic compounds containing double bonds in the ring or substituents such as 1-allyl-1-cyclopentene, cyclopentadiene, 1-alkyl-1-cyclohexene, cyclohexadiene, 4-vinylcyclohexene, ethylidenenorbornene and the like; and aromatic compounds having unsaturated substituents such as o-, m- or p-divinylbenzene, o-, m- or p- diallylbenzene and the like. Examples of suitable aliphatic compounds are aliphatic hydrocarbons, and aliphatic esters, for examples, diesters formed between unsaturaed carboxylic acids such as acrylic acid, methacrylic acid, crotonic acid, angelic acid, tiglic acid, vinylacetic acid, allylacetic acid, diallyacetic acid, oleic acid, linolenic acid, linoleic acid, etc. such as ethylene glycol, propylene glycol, butane-2,3-diol, propane-1,3-diol, butane-1,3-diol, butane-1,4-diol, etc., and diols, diesters formed between dicarboxylic acids such as oxalic acid, malonic acid, succinic acid, glutaric acid, adipic acid, pimelic acid, etc. and unsaturated alcohols such as methallyl alcohol, crotyl alcohol, methylvinylcarbinol, allylcarbinol, 4-pentenol, cis-3-hexen-1-ol, etc. esters formed between the above described unsaturated carboxylic acids and the above described unsaturated alcohols, diesters formed between the above described unsaturated carboxylic acids and the above described unsaturated diols and diesters formed between the above described unsaturated dicarboxylic acids and the above described unsaturated alcohols. Generally, these compounds have 4 to 20 carbon atoms. Preferred examples of the polyene compounds are divinylbenzenes, isoprene, butadiene, cyclopentadiene, ethylidene norbornene, diol esters of acrylic acid or methacrylic acid, or divinyl esters of adipic acid. Of these, divinylbenzenes and isoprene are especially preferred. The o-, m- and p-isomers of divinyl benzene and mixtures thereof can all be used in this invention. Generally, a mixture of these isomers is used. Generally, commercially available divinylbenzene sometimes contains about 45% by weight of ethylvinylbenzene, and this mixture can be used as such in the present invention as well.

The monomer to be graft copolymerized in this invention can be a mixture of an acyloxystyrene and a polyene compound, a mixture hydroxystyrene and a polyene compound, or a mixture of an acyloxystyrene, hydroxystyrene and a polyene compound.

Instead of using a solution containing both the styrene monomer and the polyene compound monomer, the graft copolymerization can first be carried out using a solution containing only the styrene monomer to form a graft copolymer in which a side chain composed of the styrene compound is grafted to a main chain of a hydrocarbon polymer, and then the polyene compound can be introduced into the graft copolymer using ionizing radiation, which also has the effect of inducing cross-linking of the copolymer by the polyene compound.

The mixing ratio between the styrene compound and the polyene compound can be selected as desired. Since the properties of the graft copolymer obtained vary according to the mixing ratio, the mixing ratio should be selected according to the properties desired in the graft copolymer. Generally, as the proportion of the polyene compound increases the mechanical properties of the graft copolymer, especially its strength as a membrane, are improved, and its electric resistance also increases. However, if the proportion of the polyene compound becomes too high, the degree of cross linking becomes too high, making it difficult to perform the grafting reaction. Furthermore, the resulting product becomes brittle, and since the amount of the styrene compound to be grafted decreases, the properties of the polymer, such as its adhesiveness, dyeability or oxidation resistance, tend to be deteriorated. Accordingly, the weight ratio of the sytrene compound to the polyene compound is about 200 : 1 to 1 : 1, preferably 50 : 1 to 2 : 1.

The styrene compound and the polyene compound are used for the graft copolymerization reaction as solutions in organic solvents which uniformly dissolve the styrene compound and the polyene compound, but do not dissolve the hydrocarbon polymer. Examples of suitable organic solvents are ketones such as acetone or methyl ethyl ketone, esters such as ethyl acetate or butyl acetate, alcohols such as methyl alcohol, ethyl alcohol, propyl alcohol or butyl alcohol, ethers such as tetrahydrofuran, aromatic hydrocarbons such as benzene or toluene, aliphatic or alicyclic hydrocarbons such as n-heptane or cyclohexane or mixtures thereof. Because aliphatic or alicyclic hydrocarbons have high affinity for the hydrocarbon polymers, they swell the polymers and permit easy introduction of the monomer. Thus, the grafting reaction is accelerated, and the grafting becomes uniform. The amount of these hydrocarbons should be such that they do not dissolve the polymer at the reaction temperatures, and the amount is determined according to the type of the polymer.

The concentration of the monomer in the reaction solution is not critical, but generally, a suitable concentration of the monomer is about 0.1 to 80% by weight, preferably 5 to 50% by weight, based on the weight of the solution.

The grafting ratio can be varied as desired. From the viewpoint of modifying the hydrocarbon polymer, the grafting ratio of the resulting graft copolymer is preferably at least about 0.1% by weight.

The term "grafting ratio", as used herein, means the weight percent of the amount of the monomers grafted based on the weight of the hydrocarbon polymer.

The grafting ratio can be determined as desired according to the type of modification. For example, where improved dye-ability or adhesiveness of the polymer is desired, subjecting only the surface of the polymer to graft copolymerization is sufficient and therefore, the grafting ratio can be about 0.1% by weight. For improving reactivity, the grafting ratio is preferably at least about 10% by weight. The upper limit of the grafting ratio is not critical. When the resulting graft copolymer is used as an ion-exchange membrane either as such or after introducing a sulfonic acid group, quaternary ammonium group or quaternary phosphonium group thereinto, the grafting ratio of hydroxystyrene in the graft copolymer is generally about 5 to 500%. If the grafting ratio is less than about 5%, the polymer exhibits insufficient properties as an ion-exchange membrane. If the grafting ratio is above 500%, the strength and softness of the polymer are insufficient, and it is difficult to use the polymer as an ion-exchange membrane. The weight ratio of grafting or introducing the polyene compound (based on the hydrocarbon polymer) is generally about 0.5 to 100 %. If the ratio is less than about 0.5%, crosslinking is insufficient so that the ion selectivity of the polymer is insufficient, and no outstanding effect is obtained by incorporation of the polyene compound. On the other hand, if the ratio is more than about 100%, cross-linking becomes excessive, the polymer generally tends to be hard, brittle and tearable, and to have a high electric resistance that makes the passage of electricity through the polymer difficult. In view of the ion transport number, electric resistance and strength of the membrane, an especially preferred grafting ratio is about 20 to 200% for hydroxystyrene, and about 2 to 50% for the polyene compound.

The graft copolymerization in accordance with this invention is carried out using ionizing radiation. Ionizing radiation leads to the formation of a trapped radical or a polymer peroxide on the hydrocarbon polymer, and a side chain composed of the styrene compound and/or the polyene compound is formed on the above active site. At the same time, a partial cross linking by the polyene compound occurs in the polymer. When the monomeric mixture to be grafted contains an unsaturated compound such as ethyl vinylbenzene, for example, such an unsaturated compound is also graft copolymerized and contained in the side chain. The presence of unsaturated compounds other than acyloxystyrenes, hydroxystyrene and polyene compounds especially monounsaturated compounds other than those having a polymerization inhibiting action, for example, styrene, 1-hexene and acrylic acid esters in addition to ethylvinylbenzene does not adversely affect the copolymerization. However, if the amount of such an unsaturated compound is too large, the effect of the present invention is reduced. For practical purposes, therefore, the amount of such a compound must be 30% by weight or less based on the total amount of the monomeric mixture.

The graft polymerization method using ionizing radiation includes a pre-irradiation process which comprises subjecting a base polymer to ionizing radiation in the absence of monomer, and then contacting the polymer with the monomer, and a simultaneous irradiation process which comprises subjecting both a base polymer and a monomer simultaneously to ionizing radiation. In the present invention, either of these two methods can be used. The source of ionizing radiation can be γ-rays, X-rays, electron beams, α-rays, or mixtures of these. A suitable intensity, that is, dose, of the ionizing radiation is about $10^3$ to $10^{11}$ rads per hour. With electron beams, doses of as high as about $10^9$ to $10^{11}$ rads per hour can be used. Although lower doses can be used, a long time is required to obtain the desired amount of irradiation. Furthermore, higher doses can also be used, but are not feasible because a higher dose may result in a structural change of the polymer, for example, excessive cross linking, cleavage of the main chain, and deformation and breakage of the polymer by heat.

The use of electron beams generated from an electron beam accelerator is especially effective since high dose irradiation can be obtained within short periods of time. The total dose of ionizing radiation required for graft copolymerization is usually from about $10^5$ rads to $10^{10}$ rads.

The temperature employed for ionizing radiation must be one at which the hydrocarbon polymer is not dissolved and deformed. In view of the life of the generated radicals (which is short at high temperatures), a feasible temperature is generally from about $-100°C$. to $40°C$. There is no particular lower limit to this temperature except for economical and technical problems.

According to the pre-irradiation method, the hydrocarbon polymer is subjected to ionizing radiation in vacuo or in an inert gas such as nitrogen helium, neon, argon, carbon dioxide, etc. and then the hydrocarbon polymer is immersed in an organic solvent solution of the styrene compound and the polyene compound to graft these monomers to the hydrocarbon polymer.

The graft copolymerization reaction temperature is generally from the temperature at which the reaction mixture is liquid, to about 100°C. If the reaction temperature is too low, the time required for the reaction becomes longer, and if it is too high, gellation or homopolymerization under heat tends to occur. A suitable temperature can be selected so that such difficulties do not occur. For practical purposes, temperatures of about 0° to 70°C. are suitable. Where ionizing radiation is applied in air, the graft copolymerization is preferably carried out at a temperature of about 60°C. or more because the peroxide generated must be decomposed. Ionizing radiation in advance in air or in a stream of nitrogen is commercially advantageous.

When the simultaneous irradiation process is employed, the hydrocarbon polymer is immersed in an organic solvent solution containing the styrene compound and the diene compound, and the solution is subjected to ionizing radiation thereby to graft the monomers to the hydrocarbon polymer. The same reaction temperature as in the pre-irradiation process can be used.

Alternatively, in the process of this invention, the styrene compound alone is first grafted to the hydrocarbon polymer, and then the polyene compound is grafted thereto, using ionizing radiation.

The reaction time can be varied over a wide range according to the properties of the desired graft copolymer, the dose of irradiation, and the grafting ratio. The reaction time may sometimes be as short as about 5 to 6 seconds, but in the case of the pre-irradiation process, more than one month is required.

The resulting graft copolymer, if desired, is washed with an organic solvent, for example, an alcohol such as methanol, ethanol or propanol, a ketone such as acetone or methyl ethyl ketone, or an aromatic hydrocarbon such as benzene or toluene, or mixtures of these. Graft copolymers containing a side chain comprising the acyloxystyrene can, if desired, be hydrolyzed to convert the acyloxy group in the side chain to a hydroxyl group. This hydrolysis treatment, like an ordinary hydrolysis of phenol esters, is much easier to perform than the hydrolysis of esters of primary alcohols, and can be carried out easily under mild conditions. Specifically, the graft copolymer is placed in a solution of an acid such as hydrochloric acid, sulfuric acid or an organic sulfonic acid such as ethanesulfonic acid, p-toluenesulfonic acid, benzenesulfonic acid, etc. or a base such as sodium hydroxide or ammonia as a catalyst, in an amount of from about 0.1 to 50%, preferably 1 to 20%, by weight based on the graft copolymer, in water or in a mixture of water and an organic water-soluble solvent e.g., alcohols such as methanol, ethanol, etc.; ketones such as acetone, methyl ethyl ketone, etc.; and ethers such as tetrahydrofuran, dioxane, etc. to hydrolyze the acyloxy group at the side chain. Since the hydrolysis is primarily carried out in a heterogeneous system, it is preferably performed in a mixture of water and a water-soluble organic solvent such as an alcohol or ketone in order to increase the affinity between the substrate and the catalyst and also to dissolve the organic acid that has been split off in the case of using an acidic catalyst. A suitable hydrolysis temperature is about 50° to 100°C. In this hydrolysis, the degree of hydrolysis of the acyloxy group in the side chain can be varied as desired. When the temperature is elevated and the time is prolonged, the degree of hydrolysis increases.

According to this invention, a novel graft copolymer which has a side chain composed mainly of acyloxystyrene or hydroxystyrene or a mixture of these compounds and the polyene compound and a main chain of a hydrocarbon polymer partially crosslinked with the polyene compound contained in the side chain can be obtained. This graft copolymer has suitable functional groups in addition to the superior mechanical properties of the hydrocarbon polymer. Accordingly, the adhesiveness, dyeability, oxidation resistance or reactivity with other compounds of the hydrocarbon polymer can be markedly improved. Graft copolymers containing a side chain comprising hydroxystyrene are especially superior in these properties, and are especially useful as a material for reactive polymers. The graft copolymers of this invention have better mechanical and chemical properties than those to which only the styrene compound of the formula (I) has been grafted.

The graft copolymers so obtained can be easily formed into film-like facricated articles of uniform quality and desired size. In order to produce large-sized membranes of uniform quality, it is effective to graft copolymerize hydroxystyrene and the polyene compound with a film-like hydrocarbon polymer.

The graft copolymers of this invention are suitable as packaging films, structural materials such as handles or rods, and especially as ion-exchange membranes or basic polymer matrices for ion-exchange membranes.

The introduction of a sulfonic acid group into a film-like graft copolymer having a side chain containing hydroxystyrene can be effected by any known method of sulfonating phenols, e.g., as disclosed in *Rodd's Chemistry of Carbon Compounds* 2nd. Ed. Edited by S. Coffey, Vol. III, Part A, p374, Elsevier Pub. Co. Inc., 1971 or sulfonating polyvinylpyrrolidone, e.g., as disclosed in D. I. Packam, *J. Chem. Soc.*, 1964, 2617. For example, this can be effected by sulfonating the graft copolymer with concentrated sulfuric acid, sulfuric anhydride, or chlorosulfonic acid, etc. in the presence or absence of a solvent. Examples of suitable solvents which can be used in this process are halogenated hydrocarbons such as chloroform or carbon tetrachloride, polar solvents such as pyridine or dimethylformamide, or such solvents as ether or dioxane. Catalysts such as silver sulfate can be used in this process.

When concentrated sulfuric acid is used, the film is immersed in concentrated sulfuric acid, and allowed to react for 1 hour to about 10 days at 0° to 40°C. If heating is carried out to a temperature of about 60°C., the treating time can be shortened. If the temperature is too high, the base polymer is attacked with its properties being degraded. In order to achieve a reaction mild, up to about 80% by weight of a solvent such as acetic acid or dioxane can be used. When fuming sulfuric acid containing about 5 to 60% by weight of sulfuric anhydride is used, the film is suitably treated at room temperature for about 2 to 10 hours. If the reaction proceeds excessively, the base polymer is also attacked. Where chlorosulfonic acid is used, the graft copolymer is dissolved in a solvent such as chloroform, dioxane, carbon tetrachloride or a mixture of these in a concentration of about 1 to 60% by weight, and reacted at about 0° to 60°C. for about 1 hour to 10 days. Then, the reaction product is washed with water. The reaction conditions such as the temperature, the type of reactant, the concentration, or the reaction time are controlled as required so that the proportion of sulfonic acid groups introduced becomes the desired value.

The introduction of a quaternary ammonium group can be effected by using a known method of introducing a quaternary ammonium group into hydroxystyrene e.g., as disclosed in Bruson et al, *J. Am. Chem. Soc.* 63, 2170 (1941). Suitable quaternary ammonium groups are generally those introduced into an ion-exchange membrane and the N-substituents thereof suitably contain up to about 20 carbon atoms. Specifically, the graft copolymer is first reacted with a secondary amine and an aldehyde reactant such as formaldehyde or paraformaldehyde in a suitable solvent (Mannich reaction) to form a graft copolymer in which the hydroxystyrene side chain is tertiary-aminomethylated. Examples of suitable solvents used in this method are alkali aqueous solutions, alcohols such as methanol, ethanol, propanol or butanol, or polar solvents such as tetrahydrofuran. Examples of suitable secondary amines are amines such as dimethyl amine, diethyl amine, dipropyl amine, diisopropyl amine, diallyl amine, dibutyl amine, diphenyl amine or N-methyl aniline, heterocyclic amine compounds such as pyrrole, pyrrolidine, imidazole, indole, piperidine or morpholine, or dialkanol amines such as diethanol amine, or dipropanol amine. The molar ratio of the secondary amine to the aldehyde reactant is desirably about 3:2 to 2:3. The ratio of these to the graft copolymer is adjusted according to the desired ratio of the aminomethyl group introduced. A suitable reaction temperature used in this reaction is about 0° to 200°C., preferably 15° to 150°C. Usually, the reaction is carried out for about 10 to 50 hours. A quaternary ammonium group is introduced into the resulting tertiary aminomethylated graft copolymer using a halide or a dialkyl sulfate etc. The halide used in this process can be monohalides, for example, alkyl halides (chlorides, bromides or iodides, etc.) containing 1 to 20 carbon atoms, alkenyl halides, substituted or unsubstituted benzyl halides, halogenated acetic acid, or halohydrins. The tertiary aminomethyl group introduced into the graft copolymer is quaternized by such a monohalide. Dihalides, for example, dihalides containing an alkyl group with 2 to 6 carbon atoms (for example, 1,2-dibromoethane or 1,4-dibromobutane), dihalides containing an ether group (for example, $\beta, \beta'$-dichlorodiethyl ether), or dihalides containing a phenyl group (for example, $\omega,\omega'$-dichloro-p-xylene), and epihalohydrins can also be used. This quaternization reaction is carried out usually at a temperature of about 15° to 150°C. in the presence of a solvent selected, for example, from alcohols, ketones, tetrahydrofuran, dimethylformamide, dimethyl sulfoxide, and hexamethylphosphoramide ($[(CH_3)_2N]_3P=O$) according to the type of the halide or dialkyl sulfate used. The concentration of the reagent is determined by, for example, the rate of reaction and the solubility, but generally, it is used in a concentration of about 5 to 100% by weight based on the material to be reacted. The reaction easily proceeds quantitatively.

Further, the introduction of the quaternary ammonium group can also be effected by chloromethylating the hydroxystyrene of the graft copolymer followed by quaternizing the resulting chloromethylated hydroxystyrene with an amine as illustrated below.

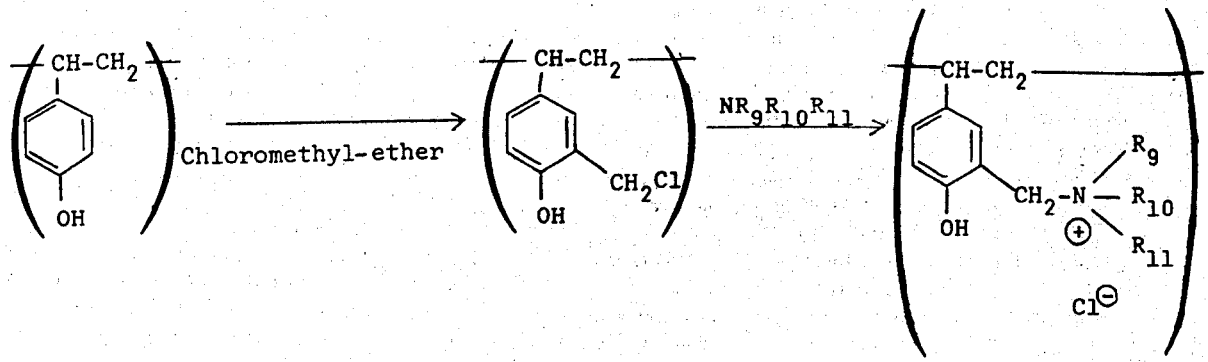

wherein $R_9$, $R_{10}$ and $R_{11}$, which may be the same or different, represent the same substituents as defined for the compounds enumerated as examples for the above described secondary amines, and halides.

The introduction of the quaternary phosphonium group can be carried out as disclosed in U.S. Pat. No. 2,764,560 and more specifically can be carried out by chloromethylating hydroxystyrene of the graft copolymer followed by quaternizing the resulting chloromethylated hydroxystyrene as illustrated below with a trivalent phosphorus compound having the formula $P[NR_{12}R_{16}]$ wherein $R_{12}$ and $R_{13}$ are as defined below.

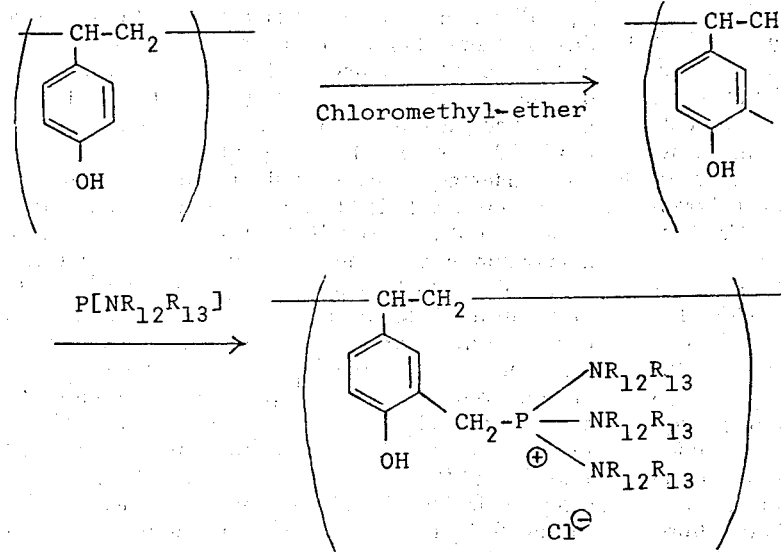

wherein $R_{12}$ and $R_{13}$ each represents an alkyl or alkylaryl group having 1 to 20 carbon atoms. Trivalent phosphorus compounds containing an ethyl group in the alkyl moiety thereof are generally employed.

By the above treatment of introducing ion-exchange groups, the ion-exchange groups are introduced mainly into hydroxystyrene at the side chain of the graft copolymer, but can also be introduced in to other parts of the side chain without exerting any adverse effect.

In the ion-exchange group introducing treatment, the number of ion-exchange groups to be introduced per unit of hydroxystyrene in the side chain can be adjusted as desired by selecting the reaction conditions. A suitable number of ion-exchange groups is about 0.5 to 2 per unit of the hydroxystyrene, preferably 1 to 2 from the standpoint of the electric resistance and the ion selectivity of the resulting product.

In the case of sulfonation, about one sulfonic acid group is introduced per unit of the hydroxystyrene if the graft copolymer is treated with concentrated sulfuric acid at room temperature for about 10 hours. When a strong sulfonating agent such as chlorosulfonic acid is used, the treatment of the polymer in a solution of chloroform or dioxane, etc. results in the introduction of about 2 sulfonic acid groups per unit of the hydroxystyrene, and a membrane having a high ion-exchange capacity can be obtained. On the other hand, when the graft copolymer is tertiary-aminomethylated and subsequently quaternized, 1 to 2 tertiary aminomethyl groups can be introduced per unit of the hydroxystyrene by controlling the reaction conditions such as the reaction temperature and pressure at the time of the aminomethylation, and the ratios of the secondary amine and the aldehyde reactant fed to the graft copolymer. The number of tertiary aminomethyl groups increases with higher reaction temperature and pressure and higher ratios to be charged. A suitable number of phosphonium groups is 1 to 2 groups per hydroxystyrene unit.

Ion-exchange membranes obtained in the above manner have good electrical and chemical properties and superior mechanical strength and durability and also superior chemical stability such as resistance to solvents or resistance to alkalis. Accordingly, they are useful as electrically dialyzing membranes for concentration and desalination of sea water. Furthermore, the ion-exchange membranes in accordance with this invention have improved characteristics at elevated temperatures and can endure use under more severe conditions than the conventional ion-exchange membranes which were prepared from a graft copolymer consisting of a polyolefin main chain without a cross-linked structure ascribable to a polyene compound to which a hydroxystyrene side chain is grafted.

The following Examples are given to illustrate the present invention further, but are not to be construed as limiting in any way the scope of the present invention. Unless otherwise indicated, all parts, percents, ratios and the like are by weight.

EXAMPLE 1

One leg of a glass H-type cell (diameter 10 mm, thickness 0.5 mm) was charged with a 0.1 mm thick polyethylene film washed thoroughly with acetone and the other leg was charged with a solution of a mixture of p-acetoxystyrene and divinylbenzene (commercial grade, containing 55% by weight of divinylbenzene with an m- to p- weight ratio of about 2 : 1, and the remainder being mainly ethylvinylbenzene, hereinafter the same) in a weight ratio (p-acetoxystyrene : divinylbenzene) of 9 : 1 in two times its weight of a mixture of benzene and acetone (in a benzene : acetone volume ratio of 3 : 1). By repeating a freezing-melting procedure 5 times, the cell was thoroughly degassed in vacuo, and then heat-sealed. The monomer solution part was frozen, and sufficiently covered with a lead plate. While the entire H-type cell was being cooled at $-30°C$, electron beams in a dose of 30 M rads were applied to the polyethylene film at an acceleration voltage of 1.5 MeV using an electron beam accelerator.

After the irradiation, the monomer solution was transferred to the film-containing portion to dip the film in the solution and allow it to react for 24 hours at 25°C. After the reaction, the cell was opened. The film was withdrawn, thoroughly washed with benzene and acetone, and dried at reduced pressure until its weight became constant. The total grafting ratio calculated from the difference in weight before and after the reaction of the film was 118%. The resulting film did not change further in weight even when repeatedly washed with acetone and benzene.

The infrared absorption spectrum of the film obtained contained a strong absorption characteristic of an ester in the vicinity of 1770 cm$^{-1}$ and 1200 cm$^{-1}$ and an absorption characteristic of aromatics in the vicinity of 1615 cm$^{-1}$ and 1515 cm$^{-1}$ in addition to an absorption inherent to polyethylene. From this, it is clear that p-acetoxystyrene was grafted to the polyethylene.

The film obtained was placed in a 100 ml flask equipped with a condenser. Then, 50 ml of a mixture of concentrated hydrochloric acid and methanol in a mixing ratio by weight of 1 : 4 was added, and the flask was heated for 30 minutes over a hot water bath. The resulting film was examined by infrared absorption spectroscopy. It was found that the ester group was completely hydrolyzed, and an absorption based on a phenolic hydroxy group was newly observed.

The film was dried at reduced pressure until its weight became constant. The total grafting ratio calculated from the difference in weight before and after the reaction of the film was 95.3%. The grafting ratio of p-acetoxystyrene alone calculated from the difference in weight of the film before and after the hydrolysis reaction was 87.3%. Thus, the grafting ratio of divinylbenzene was calculated as 30.7%. The results of quantitative analysis of the phenolic hydroxyl group by reacetylation and neutralization of the hydrolyzed film and the values determined by the elemental analysis corresponded substantially with those obtained above.

EXAMPLE 2

A graft copolymerization was carried out in the same manner as described in Example 1 except that the weight ratio of p-acetoxystyrene : divinylbenzene fed was changed to 15 : 1. The total grafting ratio calculated from the increase in weight of the resulting grafted film was 82%. The grafted film was hydrolyzed in the same manner as described in Example 1. The total grafting ratio of the graft film became 64.9%. The grafting ratios of p-acetoxystyrene and divinylbenzene as measured from the difference in weight of the film before and after the hydrolysis were 69.0% and 13.0%, respectively.

EXAMPLE 3

A graft copolymerization reaction was carried out except that the weight ratio of p-acetoxystyrene : divinylbenzene fed was changed to 4 : 1. The total grafting ratio calculated from the increase in weight of the grafted film was 98.6%. The grafted film was hydrolyzed in the same manner as described in Example 1. The total grafting ratio became 85.8%. The grafting ratios of p-acetoxystyrene and divinylbenzene calculated from the difference in weight of the grafted film before and after the hydrolysis were 49.3% and 49.3%, respectively.

EXAMPLE 4

A graft copolymerization was carried out in the same manner as described in Example 1 except that the dose of electron beams was changed to 20 M rads. The total grafting ratio calculated from the increase in weight of the grafted film was 68%. This film was hydrolyzed in the same manner as described in Example 1. The total grafting ratio became 55.0%. The grafting ratios of the p-acetoxystyrene and divinylbenzene calculated from the difference in weight of the grafted film before and after the hydrolysis were 50.3% and 17.7%, respectively.

EXAMPLE 5

A graft copolymerization was carried out in the same manner as described in Example 1 except that a 0.1 mm thick polypropylene film was used as a base polymer. The total grafting ratio calculated from the increase in weight of the resulting grafted film was 119.4%. The film was hydrolyzed in the same way as in Example 1. The total grafting ratio became 96.5%. The grafting ratios of p-acetoxystyrene and divinylbenzene calculated from the difference in weight of the grafted film before and after the hydrolysis were 88.4% and 31.0%, respectively.

EXAMPLE 6

A graft copolymerization was carried out in the same manner as described in Example 1 except that polypropylene powder was used as the base polymer. The total grafting ratio calculated from the increase in weight of the grafted powder was 67.2%. The grafted powder of polypropylene was hydrolyzed in the same manner as described in Example 1. The total grafting ratio became 54.3%. The grafting ratios of p-acetoxystyrene and divinylbenzene calculated from the difference in weight of the grafted polypropylene powder before and after the hydrolysis were 49.7% and 17.5%, respectively.

EXAMPLE 7

A 0.1 mm thick polyethylene film was cooled to −20°C, and irradiated with electron beams in a dose of 30 Mrads in air. The film was then placed in a glass ampoule, and a solution of a monomeric mixture of p-acetoxystyrene and divinylbenzene in a weight ratio (p-acetoxystyrene : divinylbenzene) of 9 : 1 in two times its weight of a mixture of benzene and acetone in a benzene : acetone mixing ratio by weight of 3 : 1 was introduced into the ampoule. The ampoule was thoroughly degassed in vacuo by repeating a freezing-melting procedure five times, and then heat-sealed. The ampoule was placed in a constant temperature vessel at 70°C, and the film was allowed to react for 3 hours. After the reaction, the ampoule was opened, and the film was withdrawn. The film was thoroughly washed with benzene and acetone, and dried at reduced pressure until its weight became constant. The total grafting ratio calculated from the increase in weight of the grafted film was 30.5%. The grafted film was hydrolyzed in the same manner as described in Example 1. The total grafting ratio became 24.4%. The grafting ratios of p-acetoxystyrene and divinylbenzene calculated from the difference in weight of the grafted film before and after the hydrolysis were 23.5% and 7.0%, respectively.

EXAMPLE 8

A 0.1 mm thick polyethylene film was placed in a glass ampoule, and a solution of a monomeric mixture of p-acetoxystyrene and divinylbenzene in a weight ratio (p-acetoxystyrene : divinylbenzene) of 9 : 1 in 9 times its weight of a mixture of benzene and acetone in a benzene : acetone volume ratio of 3 : 1 was placed in the ampoule. The ampoule was sufficiently degassed in vacuo by repeating a freezing-melting procedure five times and then heat-sealed. Using a cobalt 60 source, γ-rays were applied to the ampoule at a dose of $1.1 \times 10^5$ rads/hour at 20° to 25°C for 24 hours. Then, the film was taken out of the ampoule, washed sufficiently with benzene and acetone to remove a byproduct copolymer composed of p-acetoxystyrene and divinylbenzene, and then dried. The total grafting ratio calculated from the increase in weight of the grafted film was 79%. The grafted film was hydrolyzed in the same manner as described in Example 1. The total grafting ratio became 64.7%. The grafting ratios of p-acetoxystyrene and divinylbenzene calculated from the difference in weight of the grafted film before and after the hydrolysis were 55.3% and 23.7%, respectively.

EXAMPLE 9

A graft copolymerization was carried out in the same manner as described in Example 1 except that p-hydroxystyrene was used instead of the p-acetoxystyrene. The total grafting ratio calculated from the increase in weight of the resulting grafted film was 5.9%. The grafted film was acetylated using acetic anhydride and sodium acetate. From the acetylation value of the grafted film so determined, the grafting ratios of p-hydroxystyrene and divinylbenzene were found to be 4.8% and 1.1%, respectively.

The grafting ratios of p-hydroxystyrene and divinylbenzene of this grafted film which were calculated from elemental analysis values of the grafted film and the acetylated film substantially corresponded with the above values.

EXAMPLE 10

A graft copolymerization was carried out in the same manner as described in Example 1 except that isoprene was used instead of the divinylbenzene. The total grafting ratio calculated from the weight increase of the grafted film was 28.6%. The grafted film did not further change in weight even when extracted with acetone and benzene. The film was hydrolyzed in the same manner as described in Example 1. The total grafting ratio became 21.6%. The grafting ratios of p-acetoxystyrene and isoprene determined from the difference in weight of the grafted film before and after the hydrolysis were 27.0% and 1.6%, respectively.

EXAMPLE 11

In the same manner as described in Example 1, one leg of an H-type cell was charged with a 0.1 mm thick polyethylene film and the other leg was charged with a solution of a monomeric mixture of p-hydroxystyrene, p-acetoxystyrene and divinylbenzene in a weight mixing ratio of 4.5 : 4.5 : 1 in two times its weight of a mixture of benzene and acetone at a benzene : acetone mixing ratio by volume of 3 : 1. The cell was degassed in vacuo, and heat-sealed. Electron beams were applied to the polyethylene film in vacuo in a dose of 30 Mrads. After the irradiation, the monomer solution was transferred to the film-containing portion, and the film was reacted for 24 hours at 20°C. After the reaction, the film was taken out, washed thoroughly with acetone and benzene, and dried at reduced pressure until its weight became constant. The total grafting ratio calculated from the difference in weight of the film before and after the reaction was 64%. The film was acetylated, and from the acetylation value obtained, the grafting ratio of p-hydroxystyrene was calculated as 4.3%. The film was hydrolyzed, and the grafting ratios of p-acetoxystyrene and divinylbenzene were calculated from the difference in weight of the film before and after the hydrolysis and found to be 47.8% and 11.9%, respectively.

EXAMPLE 12

A graft copolymerization was carried out in the same manner as described in Example 1 except that a 0.1 mm thick polystyrene film was used as a base polymer, and a mixture of methanol and benzene in a volume ratio (methanol : benzene) of 2 : 1 was used as a solvent. The total grafting ratio calculated from the weight increase of the grafted film was 54.1%. When this grafted film was hydrolyzed, the total grafting ratio became 45.6%. The grafting ratios of p-acetoxystyrene and divinylbenzene determined from the difference in weight of the grafted film before and after the hydrolysis were 32.6% and 21.5%, respectively.

EXAMPLE 13

A graft copolymerization was carried out in the same manner as described in Example 1 except that m-acetoxystyrene was used instead of the p-acetoxystyrene. The total grafting ratio of the grafted film calculated from the weight increase of the film was 92.3%. When this film was hydrolyzed, the total grafting ratio became 74.4%. The grafting ratios of m-acetoxystyrene and divinylbenzene determined from the difference in weight before and after the hydrolysis were 57.1% and 35.2%, respectively.

EXAMPLE 14

One leg of a glass H-type cell (diameter 10 mm, thickness 0.5 mm) was charged with a 0.1 mm thick polyethylene film washed thoroughly with acetone and the other leg was charged with a solution of a monomeric mixture of p-acetoxystyrene and divinylbenzene (commercial grade, containing 55% by weight of divinylbenzene with the remainder being mainly ethylvinylbenzene) in a weight ratio (p-acetoxystyrene : divinylbenzene) of 20 : 1 in 2 times its weight of a mixture of benzene and acetone in a benzene : acetone volume ratio of 3 : 1. The cell was sufficiently degassed in vacuo by repeating a freezing-melting procedure five times, and heat-sealed. The monomer solution part was frozen, and sufficiently covered with a lead plate. While the entire cell was being cooled to −30°C, electron beams were applied to the polyethylene film in vacuo in a dose of 30 Mrads at an accelerating voltage of 1.5 MeV using an electron accelerator. After the irradiation, the monomeric solution was transferred to the film-containing portion, and the film was reacted for 24 hours at 25°C. After the reaction, the cell was opened, and the film was taken out. Then, the film was thoroughly washed with acetone and benzene, and dried at reduced pressure until its weight became constant. The resulting film had a total grafting ratio of 68.8% as calculated from the difference in weight before and after the reaction.

The film was heated under reflux in a 1 : 4 mixture by weight of concentrated hydrochloric acid and methanol for 30 minutes to hydrolyze it. The resulting film was one in which p-hydroxystyrene and divinylbenzene were grafted to the base polymer. The total grafting ratio calculated from the difference in weight before and after the reaction was 56.1%, and the grafting ratios of p-hydroxystyrene and divinylbenzene calculated from the difference in weight of the film before and after the hydrolysis were 51.1% and 5.0%, respectively.

The film was dipped for 10 hours in a 1:1 (by weight) mixture of chlorosulfonic acid and dioxane at 50°C, then withdrawn, and washed with water. The resulting film had an ion-exchange capacity of 2.35 meq/g (when dry), an electric resistance, as measured in a 0.5N aqueous solution of sodium chloride, of 1.3Ωcm², and an ion transport number, according to a membrane potential method, of 0.99. When wet, this film had a tensile strength of 1.1 Kg/mm².

EXAMPLE 15

A 0.1 mm thick polyethylene film was subjected to graft copolymerization in the same manner as described in Example 14. The grafting ratio of m-hydroxystyrene was 49.7%, while the grafting ratio of divinylbenzene was 8.4%. The grafted film was immersed for 10 hours in a 1:1 (by weight) mixture of chlorosulfonic acid and dioxane at 50°C, withdrawn, and washed with water. The resulting film had an ion-exchange capacity of 2.22 meq/g (when dry), an electric resistance of 0.8Ωcm², an ion transport number of 0.98, and a tensile strength of 1.3 Kg/mm² (when wet).

EXAMPLE 16

A 0.1 mm thick polyethylene film was subjected to graft copolymerization in the same manner as described in Example 14. The grafting ratio of p-hydroxystyrene was 20%, while the grafting ratio of isoprene was 1.6%. The grafted film was allowed to stand in 96% concentrated sulfuric acid at room temperature for 24 hours, withdrawn, and washed with water. The resulting film had an ion-exchange capacity of 1.14 meq/g (when dry), an electric resistance of 4.5Ωcm², an ion transport number of 1.0 and a tensile strength of 1.0 Kg/mm² (when wet).

EXAMPLE 17

A grafted film which was obtained in the same manner as described in Example 14 and in which the grafting ratio of p-hydroxystyrene was 51.1%, and the grafting ratio of divinylbenzene was 5.0% was immersed in a mixture of 3.1 g of para-formaldehyde, 5.4 of dimethyl amine and 70 ml of ethanol, and reacted at 85 to 90°C to dimethylaminomethylate the polymer. The resulting dimethylaminomethylated product was immersed in an ethanol solution containing 10% of methyl bromide to react the product for 40 hours at 25°C. The reaction product was withdrawn, and thoroughly washed with ethanol. The film obtained had an ion-exchange capacity of 2.42 meq/g, an electric resistance of 2.3Ωcm², an ion transport number of 0.99 and a tensile strenght of 0.9 Kg/mm².

EXAMPLE 18

One leg of the same H-type cell as used in Example 14 was charged with a 0.1 mm thick polypropylene film and the other leg was charged with an acetone-benzene solution (a benzene : acetone mixing ratio by volume of 2 : 1) containing 20% by weight of p-acetoxystyrene. The cell was fully degassed in vacuo by repeating a freezing-melting procedure five times, and then heat-sealed. The monomer solution part was frozen and fully covered with a lead plate. While the entire H-type cell was being cooled at −30°C, the polypropylene film in vacuo was subjected to the irradiation of electron beams at a dose of 10 Mrads. After the irradiation, the monomer solution was transferred to the film-containing portion, and reacted at 20°C for 24 hours. After the reaction, the film was taken out, washed thoroughly with acetone and benzene, and dried at reduced pressure until its weight became constant. The grafting ratio of p-acetoxystyrene in the resulting film, as calculated from the difference in weight before and after the reaction, was 87.6%.

The film was further placed in one leg of another H-type cell, and an acetone-benzene mixed solution (a benzene : acetone volume ratio of 2 : 1) containing 10% by weight of divinylbenzene was placed in the other leg of the cell, and the cell was heat-sealed in vacuo. In the same manner as described above, the film in vacuo was subjected to the irradiation of electron beams at a dose of 10 Mrads. After the irradiation, the monomer solution was transferred to the film-containing portion, and reacted at 20°C for 24 hours. The grafting ratio of divinylbenzene in the resulting film, as calculated from the difference in weight before and after the reaction, was 21%.

The film obtained was hydrolyzed by heating it under reflux for 30 minutes in a 1:4 by volume mixture of concentrated hydrochloric acid and methanol. The hydrolyzed film was further immersed for 10 hours in a 1:1 by weight chlorosulfonic acid:dioxane mixed solution at 50°C, withdrawn, and then washed with water. The resulting film had an ion-exchange capacity of 2.24 meq/g (when dry), an electric resistance of 5.6Ωcm², an ion transport number of 0.99, and a tensile strength of 2.7 Kg/mm² (when wet).

EXAMPLE 19

A 0.1 mm thick polystryene film was subjected to the same graft copolymerization and hydrolysis as in Example 14 except that a 2:1 by volume mixture of methanol and benzene was used as a solvent to form a grafted film in which the grafting ratio of p-hydroxystryene was 55.2% and the grafting ratio of divinylbenzene was 6.5%. The grafted film was allowed to stand in 96% concentrated sulfuric acid at room temperature for 24 hours, withdrawn, and then washed with water. The film obtained had an ion-exchange capacity of 2.25 meq/g (when dry), an electric resistance of 4.8Ωcm², a cation transport number of 0.98 and a tensile strength of 0.5 Kg/mm²(when wet).

While the invention has been described in detail and with reference to specific embodiments thereof, it will be apparent to one skilled in the art that various changes and modifications can be made therein without departing from the spirit and scope thereof.

What is claimed is:

1. A graft copolymer comprising a hydrocarbon polymer main chain and a side chain composed mainly of a styrene compound of the following general formula (I)

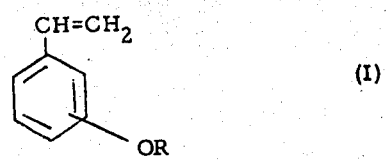

wherein R is a hydrogen atom or an R'CO group, in which R' is a hydrocarbon group having 1 to 20 carbon atoms,
and a polyene compound containing at least two polymerizable double bonds in the molecule grafted to the hydrocarbon polymer main chain, the grafting ratio of said styrene compound being about 0.1 to 500% and the grafting ratio of said polyene compound being about 0.1 to 100% based on the weight of the hydrocarbon polymer.

2. The graft copolymer of claim 1, wherein said hydrocarbon polymer is an aliphatic hydrocarbon polymer, an aromatic hydrocarbon polymer, an alicyclic hydrocarbon polymer, or a copolymer derived from at least two of an aliphatic monomer, an aromatic monomer and an alicyclic monomer.

3. The graft copolymer of claim 1, wherein said hydrocarbon polymer is polyethylene.

4. The graft copolymer of claim 1, wherein said hydrocarbon polymer is polypropylene.

5. The graft copolymer of claim 1, wherein said hydrocarbon polymer is polystyrene.

6. The graft copolymer of claim 1, wherein said hydrocarbon polymer is in the form of a film.

7. The graft copolymer of claim 1, wherein said styrene compound of the general formula (I) is hydroxystyrene.

8. The graft copolymer of claim 1, wherein said styrene compound of the general formula (I) is an acyloxystyrene.

9. The graft copolymer of claim 8, wherein said acyloxystyrene contains an acyl group having 2 to 21 carbon atoms.

10. The graft copolymer of claim 9, wherein said acyloxystyrene is acetoxystyrene.

11. The graft copolymer of claim 1, wherein said polyene compound is an aliphatic compound, an alicyclic compound, or an aromatic compound having polymerizable double bonds.

12. The graft copolymer of claim 11, wherein said polyene compound is divinylbenzene.

13. The graft copolymer of claim 11, wherein said polyene compound is isoprene.

14. The graft copolymer of claim 1, wherein the weight ratio of the styrene compound of the general formula (I) to the polyene compound is about 200:1 to 1:1.

15. The graft copolymer of claim 1, wherein said styrene compound of the general formula (I) is hydroxystyrene which further contains ion-exchange groups.

16. The graft copolymer of claim 15, wherein said ion-exchange groups are sulfonic acid groups, quaternary ammonium groups, or quaternary phosphonium groups.

17. The graft copolymer of claim 15, wherein the grafting ratio of the hydroxystyrene is about 5 to 500%, and the grafting ratio of the polyene compound is about 0.5 to 100%.

18. The graft copolymer of claim 1, wherein the amount of (1) the styrene compound of the general formula (I) and (2) the polyene compound in the side chain is 70% by weight based on the total weight of the components of the side chain.

19. A process for preparing a graft copolymer, which comprises graft copolymerizing a hydrocarbon polymer with monomers comprising mainly a styrene compound of the general formula (I)

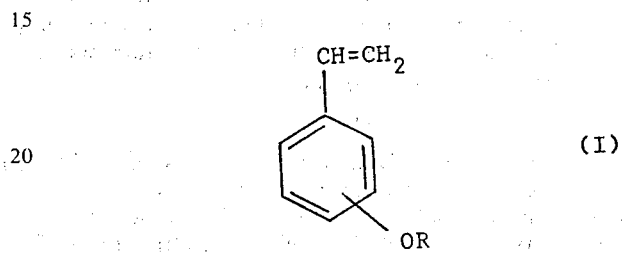

wherein R is a hydrogen atom or an R'CO group, in which R' is a hydrocarbon group having 1 to 20 carbon atoms,
and a polyene compound containing at least two polymerizable double bonds in the molecule using ionizing radiation.

20. The process of claim 19, wherin said hydrocarbon polymer is subjected to ionizing radiation in the absence of the monomers.

21. The process of claim 19, wherein said hydrocarbon polymer is subjected to ionizing radiation in the presence of the monomers.

22. The process of claim 19, including reacting the styrene compound of the general formula (I) first with the hydrocarbon polymer, and then reacting the polyene compound with the hydrocarbon polymer.

23. The process of claim 19, wherein a mixture of the styrene compound of the general formula (I) and the polyene compound is reacted with the hydrocarbon polymer.

24. The process of claim 19, wherein said styrene compound of the general formula (I) is an acyloxystyrene, and the process includes hydrolyzing the acyl group after the graft copolymerization.

25. The process of claim 19, including introducing ion-exchange groups into the product after the graft copolymerization, and if the styrene compound is an acyloxystyrene, after hydrolyzing the hydrolyzed product subsequent to the graft copolymerization.

* * * * *